United States Patent [19]

Miller et al.

[11] 4,249,684

[45] Feb. 10, 1981

[54] REMOVABLY ANCHORED BOX

[76] Inventors: Kenneth Miller, 7045 N. Kilpatrick, Lincolnwood, Ill. 60646; Le Roy Dombeck, 2527 W. Shakespeare, Chicago, Ill. 60647

[21] Appl. No.: 22,932

[22] Filed: Mar. 22, 1979

[51] Int. Cl.$^3$ .............................................. B60R 9/00
[52] U.S. Cl. ................... 224/42.4; 220/1.5; 220/18; 224/319; 248/551; 312/DIG. 33; 410/82; 410/90; 109/51
[58] Field of Search .................. 224/42.4, 42.32, 32 A, 224/273, 42.45 R, 42.46 R, 319; 220/1.5, 18; 280/769; 292/218, 202, 204; 312/DIG. 33; 105/366 C, 464, 479; 410/54, 52, 55, 82, 65, 66, 67, 68; 248/551

[56] References Cited

U.S. PATENT DOCUMENTS

| | | | |
|---|---|---|---|
| 534,012 | 2/1895 | Saunders | 220/18 X |
| 963,883 | 7/1910 | Farley | 220/18 X |
| 1,472,701 | 10/1923 | Vogelaar | 224/42.32 |
| 1,652,619 | 12/1927 | Fiss | 224/42.32 |
| 1,796,502 | 3/1931 | Boucher | 248/551 X |
| 4,122,966 | 10/1978 | Anderson | 220/1.5 |
| 4,143,927 | 3/1979 | Spear | 248/551 X |

Primary Examiner—Robert J. Spar
Assistant Examiner—Jerold M. Forsberg
Attorney, Agent, or Firm—Laff, Whitesel & Rockman

[57] ABSTRACT

The invention provides an easily transportable, general purpose box which may be carried about by hand and then anchored to rails and locked in place. Once the lid is locked on the box, no one without a key can move the box from the anchor rails. The invention is primarily intended as a portable trunk for mounting on a truck; however, it may be used anytime that a box is to be mounted on a chassis, such as a toolbox mounted on a wheeled dolly, a toolroom shelf, or the like, for example.

3 Claims, 8 Drawing Figures

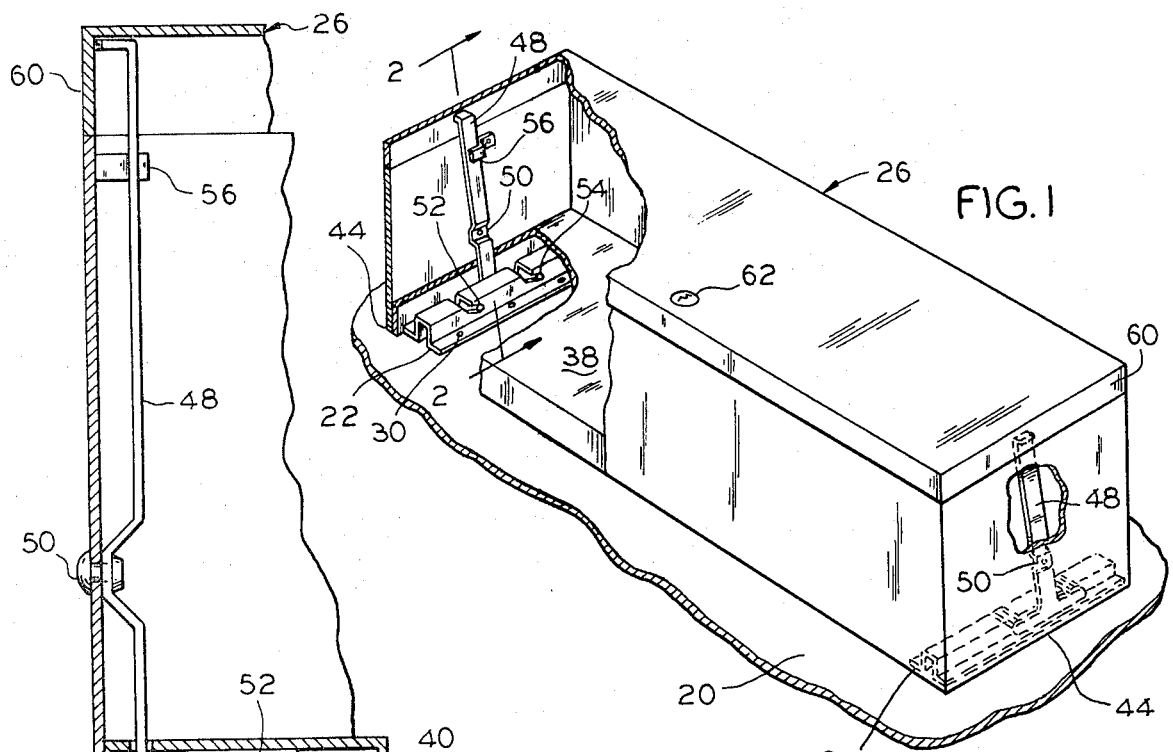
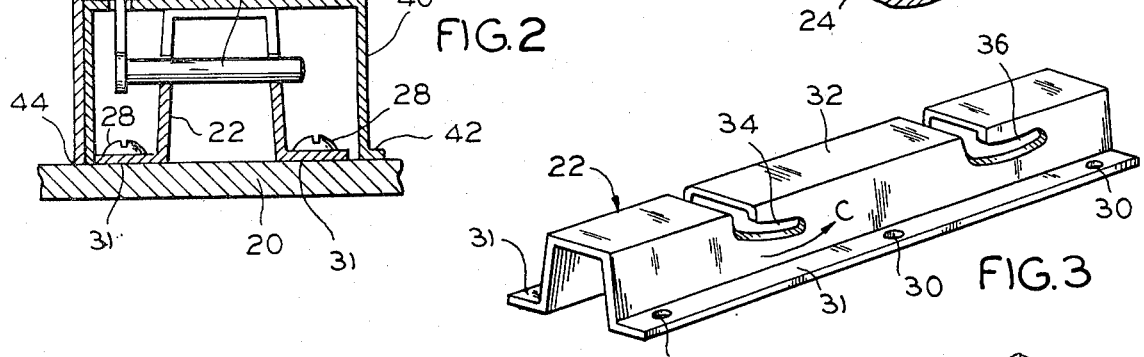
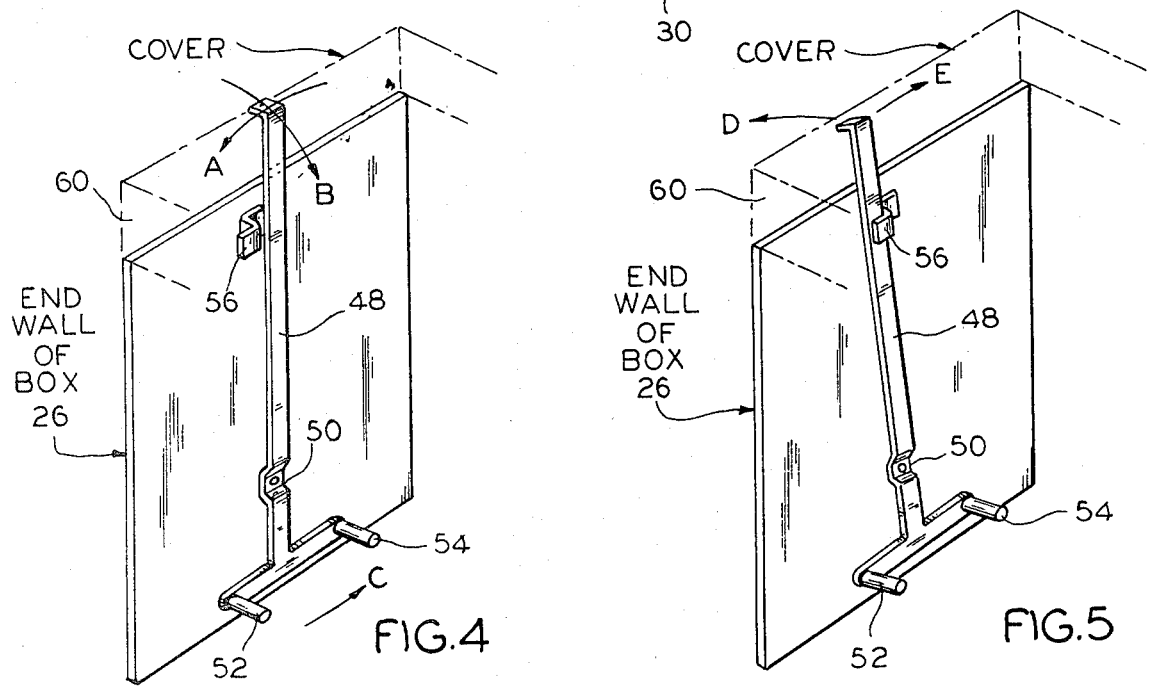

REMOVABLY ANCHORED BOX

This invention relates to trunks or boxes for mounting on any suitable chassis, such as trucks, utility vehicles, dollies, shelves, and the like, and, more particularly, to removable trunks or boxes which may be carried by hand and then locked to a chassis quickly and easily.

There are many situations where there is a need for boxes which may be carried about or anchored and locked into position on a chassis. For example, many motor vehicles do not include locked trunks and, therefore, it is impossibe to secure personal property in a closed and locked compartment. If valuables are left inside a passenger compartment, it is an invitation to break and enter. Also, it is not desirable to have tools, and the like, in a passenger compartment. Some vehicles do not even have a closed passenger compartment. Exemplary of such vehicles are the light personnel trucks or carriers of the type which are currently sold under the trademarks "JEEP," "BRONCO," "BLAZER" and "SCOUT." These light trucks are often used as automobiles for carrying people, so that it is likely that there will be at least some personal property of a type which is normally locked in the trunk of a car.

Other considerations might be exemplified by toolboxes. Tools are relatively expensive items which must be carried as a unit to a work station, and then returned to a toolroom for storage. Thus, to be most flexible, the toolbox should be easily attached to and detached from a mooring in the toolroom. In addition, it would also be handy if the box could be just as easily attached to a chassis at a work station. For example, many workers like to have their toolbox mounted on a wheeled dolly which can be pulled from a locker room or tool area to a work site. In the locker room or tool area, it would be handy to lock the box in a fixed place so that it cannot be lost or stolen.

Accordingly, an object of the invention is to provide new and improved boxes for removable mounting on trucks, dollies, in secure areas, or the like. Here, an object is to provide boxes which can be locked in place quickly and easily and then removed just as quickly and easily.

Another object of the invention is to provide a general purpose box which may be used in any of many different places and in association with different anchor bases and appliances. Here, an object is to provide an anchor system for boxes, the anchor system including a base which may be secured to a truck, a dolly, or other chassis at any place where a toolbox might be secured. In particular, an object is to provide an anchor base which may be mounted with a minimum of effort on any of many different kinds of structures.

In keeping with an aspect of this invention, these and other objects are accomplished by a combination of three parts. Two of the parts are anchor rails which may be quickly and easily secured in a spaced parallel relationship to any convenient chassis or anchor points, such as the body of a truck, a wheeled dolly, or the like. The third part is a box with recessed guideways integrally formed therein for receiving the anchor rails. A locking system is located inside the box to lock it to the anchor rails. Once the lid of the box is closed, the locking system cannot move to a release position which unlocks the box. In one embodiment, the locking system is a lever which is too long to swing from an anchoring to a non-anchoring position when the lid is closed. In another embodiment, the locking system is a series of rotatable members which snap into an anchoring position which is covered when the lid is closed. Thus, a lock on the top of the box inherently locks the box to the anchor rails.

A preferred embodiment of the invention is shown in the attached drawing, wherein:

FIG. 1 is a perspective view of a first embodiment of the inventive box, partly in cross section, to show the locking system;

FIG. 2 is a cross section of one end of the box, taken along line 2—2 of FIG. 1;

FIG. 3 is a perspective view of an anchor rail used with the box of FIG. 1;

Figure 6:
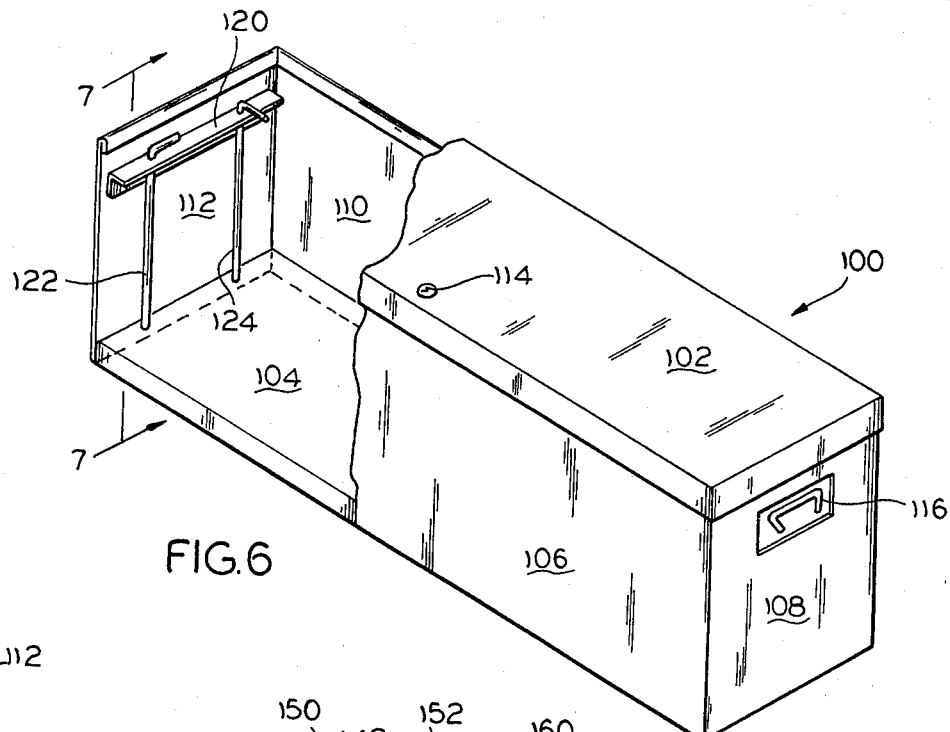
Figure 7:
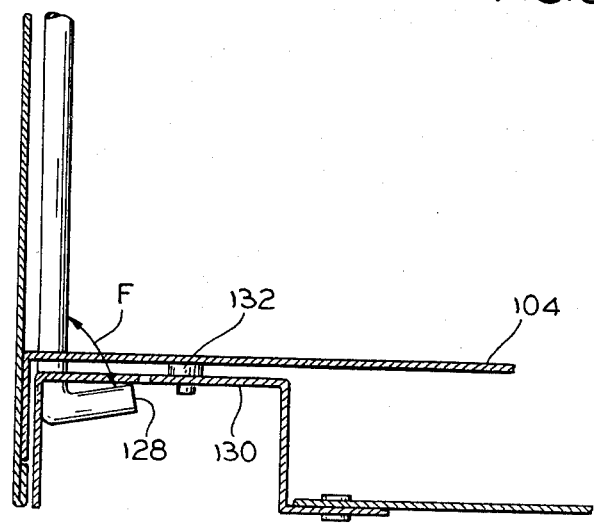

FIG. 4 schematically shows the first embodiment lever-locking system, in an unlocked position;

FIG. 5 shows the same lever system in a locked position;

FIG. 6 shows a second embodiment of the inventive box, partially broken away to show an anchoring system using rotating rods;

FIG 7 is a cross-sectional view taken along line 7—7 of FIG. 6; and

Figure 8:
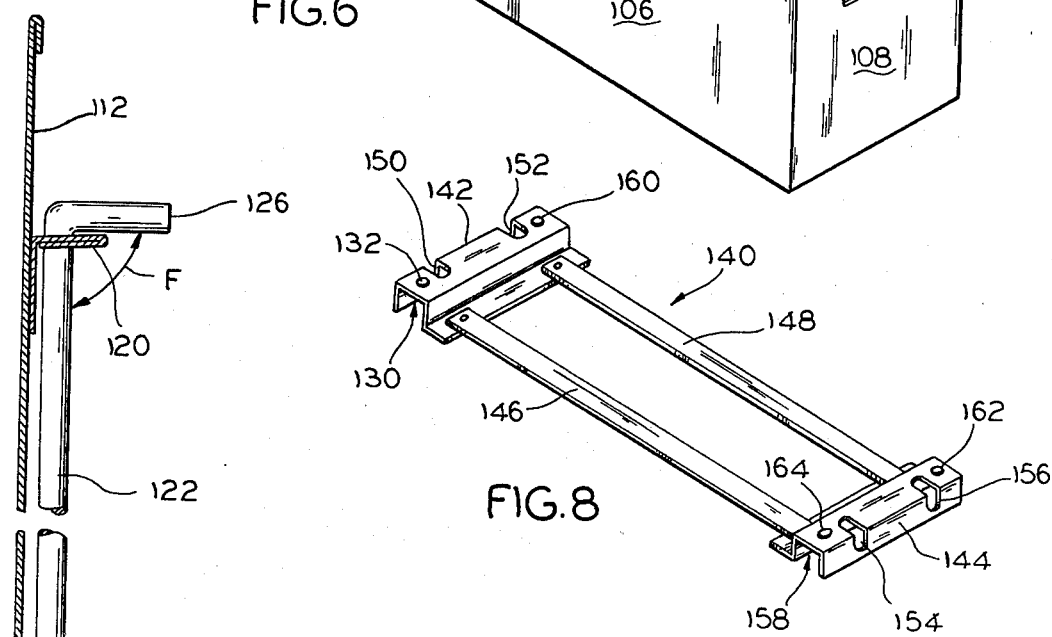

FIG. 8 is a perspective view of the anchor rails used with the embodiment of FIG. 6.

The major parts of FIG. 1 are a chassis 20, two anchor rails 22,24 and a box 26. The chassis 20 may represent any suitable support such as a truck bed, a dolly, a work bench, a storage shelf, the floor, or the like. In one embodiment, the chassis 20 may be a horizontal body panel on a light truck or personnel carrier. The rails 22,24 may be attached to this chassis in any suitable manner such as by spot welding, riveting, or the like. However, the box completely covers the anchor rails; therefore, even if sheet metal screws are the only means used for attaching the rails 22,24 to the chassis, they are secure when the box is in place and cannot be removed by a thief. A pair of sheet metal screws are shown at 28 (FIG. 2), by way of example. The spots 30 shown in other figures generically represent any suitable fasteners.

The two anchor rails 22,24 (FIG. 3) may take any suitable form and may be molded, extruded, or otherwise formed. As here shown, they are folded, heavy gauge sheet metal. In general, each anchor rail has an inverted U-shaped cross section with a pair of horizontally opposed, mounting flanges 31,31 thereon. Preferably, each flange is drilled periodically (as to 30) to receive sheet metal screws, rivets, or other fasteners. Alternately, each of the locations 30 could refer to a spot weld.

The upper ridge 32 of the U-shaped cross section includes at least two L-shaped slots 34,36. These slots form connector points since a fastener bar may pass downwardly through the vertical passage and then slide sideways into the horizontal passage. Preferably, the horizontal passage is arcuate to receive a fastener which is attached to the end of a swinging bar.

The opposite ends of the bottom of box 26 are shaped to straddle and receive a pair of spaced parallel anchor rails. For example, as seen in FIG. 1, the entire floor 38 of box 26 may be elevated to a level which covers the anchor rails 22,24; or, guideways 40 may be raised from the floor level 42 (FIG. 2) to receive the anchor rails. Either way, when the box 26 is set over the anchor rails 22,24, the bottom edge 44 of the box rests on the chassis 20 and the box covers the horizontally opposed flanges 31,31, while the interior bottom of said box is above the anchor rails so that the contents of the box do not interfere with the anchoring system. Therefore, as seen in FIG. 2, there is no way for a thief to get inside the guideways 40 and use a screwdriver, or the like, to remove the screws 28,28, or any other fasteners that may be used.

Inside each end of the box is an inverted T-shaped lever system comprising an arm 48 which is pivotally mounted on a pin 50 passing through an end of the box 26. The head or cross arm of the T includes a pair of outstanding, perpendicularly extending fastener pins 52,54 which are located beneath a surface 38 or 40 forming at least a part of the interior bottom of the box. The fastener pins are shaped and proportioned to fit into the L-shaped slots 34,36 in the anchor rails 22,24. These pins fit down and slide into the vertical section of the L-shaped slots when the box is set on the anchor rails.

A keeper 56 is attached to the inside surface of each end panel of the box 26. If desired, carrying handles may be attached to the outside of each end panel. The lever arm 48 is flexible enough to flex inwardly toward the center of the box as it passes over the keeper 56, while moving in the direction A (FIG. 4). Then, arm 56 flexes back toward the end panel to become captured behind the keeper 56, by a slightly retrogressive lever arm movement. This locking motion is seen by comparing FIGS. 4 and 5.

More particularly, in FIG. 4, the arm 48 is shown as having been sprung slightly in direction B and as being swung in direction A, passing over the keeper 56. At this time, the fastener pins 52,54 swing in direction C and through the horizontal sections of the horizontal slots 34,36 (FIG. 3). In FIG. 5, the arm 48 is shown as having been released in a locked position. First, it returns in direction D toward the end panel, owing to its own resilience. Then, the arm 48 is moved in direction E so that it passes behind the keeper 56. The fastener pin 52,54 may have a slightly retrogressive movement within the horizontal slots 34,36, but the distance of such movement is not significant. At this time, the fastener pins 52,54 are securely captured in the slots 35,36 and the box cannot be removed from the anchor rails.

Means are provided for reminding the user to lock the box in place and for preventing accidental release of the box, after it has been so locked. More particularly, one feature of the inventive system is that the locking arm 48 stands too tall to enable the box lid 60 to close, when the arm is in the unlocked position of FIG. 4. Therefore, no one can close the box and walk away, thinking that it is locked to the anchor rails. However, when the arm 48 is moved to the locked position (FIG. 5), the lid 60 can be closed and locked by a key-controlled lock 62. Even if the arm 48 should not be adequately captured by the keeper 56, the lid 60 is low enough relative to pivot point 50 to keep the arm from moving to an unlocked position.

Of course, a key may be used to unlock the lock 62 and the lid 60, which may then be opened. After that, the lever arm 48 may be moved to the unlocked position of FIG. 4 so that the box may be lifted off the anchor rails and carried away.

A second embodiment of the invention is seen in FIGS. 6-8. In general, the above-described features are also incorporated into this box. That is, the anchor rails (FIG. 8) are covered by the bottom of the box so that they cannot be removed from their supporting chassis as long as the box is in place over them. The anchor means (FIG. 7) for securing the box to the rails are located inside the box. Therefore, there is no way of removing the box from the anchor rails if the lid of the box is locked in a closed position.

The box 100 (FIG. 6) includes a top or lid 102, bottom 104 and four sides and ends 106,108,110,112. Preferably, the lid 102 is hinge-connected to one side panel 110 and locked with a key, at 114, near the other side 106, of the box. The bottom 104 is raised to enable the anchor rails to fit under and be completely enclosed when the box 100 is anchored in place. Any suitable handles 116 may be secured to opposite ends of the box so that it may be eassilly carried about.

Inside each of the ends 108,112 of the box, an angle iron 120 is welded, or otherwise secured in place. A spaced pair of holes or other suitable bearing means are supported by the bracket 120. Immediately below these bracket bearings are mating bearings. Accordingly, a pair of locking rods 122,124 are rotatably held in a vertical and spaced parallel relationship by these bearings.

Means are provided for concentrating the anchoring forces exerted by locking rods 122, 124 and reducing the friction which occurs upon rotation of the rods, of which the following means are but one example. The upper and lower ends 126,128 of rods 122,124 are then bent to project outwardly at an over perpendicular angle. For example, the angles F may each be in the order of 75 to 85 degrees. This over perpendicular bend concentrates the anchoring forces at the tips of the bent ends 126,128 and reduces the friction otherwise occurring when the locking rods are rotated.

The vertical distance between the tips of the ends 126,128 is slightly greater than the vertical distance between the upper surface of bracket 120 and the lower surface of the anchor member 130. Therefore, if the rod 122 is rotated by approximately 90 degrees from the mounting and dismounting position shown in FIG. 7, the end 126 comes to lie in a locking position over the upper bracket 120 with some degree of friction resulting from the pressure of end 126 bearing downwardly upon the upper surface of the angle iron 120. In FIG. 6, rod 122 is shown in the anchoring position and rod 124 is shown in the mounting or dismounting position.

To further assist in maintaining the anchoring pressure, a compressible and resilient rubber mount 132 is positioned between the box and the anchor rail so that it may be squeezed slightly, when the box is anchored in place.

The anchor system 140 (FIG. 8) includes a spaced parallel pair of rail members 142,144, each having a generally inverted U-shaped cross section. The two rails 142,144 are joined together by a pair of spaced parallel side rails, thereby forming a generally rectangular frame which may be secured to any suitable chasses. Each of the U-shaped members 142,144 has a pair of entrance slots or coves 150,152,154,156 cut therein. Each of these slots or coves extends deeply enough to enable the lower end 126 of an associated locking rod to pass vertically therethrough, when the end is projecting perpendicularly from the end wall 112 or 108. After the lower ends 128 of the locking rods have passed vertically through the slots or coves 150,152,154,156, the upper ends 126 may be rotated so that the lower ends 128 pass under the lower surfaces 130,158. In general, the length of upper end 126 is adequate to provide sufficient leverage to easily rotate the rods. However, a suitable tool may be provided to fit over the end and rotate the rods, is desired.

The inverted U-shaped members 142,144 also include and support a plurality of the resilient rubber mounts 132,160,162,164 which are positioned between the tops of the anchor rails 142,144 and the bottom 104 of the box. Therefore, when the box is in place over the anchor rails, each of the mounts must be squeezed somewhat in order to rotate the locking rods 122,124. This resilience provides at least some of the contact pressure required to hold the rods securely in their lock position.

When the lid or cover 102 is locked (at 114) in place on the box, it is not possible to reach into the box and rotate the locking rods 122,124 to their dismounting position. Therefore, the box cannot be easily stolen or removed without authorization.

Those who are skilled in the art will readily perceive how to modify the system. Therefore, the appended claims are to be construed to cover all equivalent structures which fall within the true scope and spirit of the invention.

We claim:

1. A system for securing a box to a chassis comprising: a box having a lockable cover, side walls, and a bottom which is raised at least in part; at least two spaced parallel anchor rails affixed to said chassis to which said box may be locked, each of said anchor rails having at least one slot and a configuration which can be accommodated beneath said raised bottom portion of said box, thereby making the anchor rails inaccessible when the box is secured to the chassis; means for securing said anchor rails to said chassis; a pair of brackets, each secured to an interior side wall of said box; at least one locking rod associated with each of said brackets and vertically supported by said brackets, said rods having top and bottom angled portions, said top angled portion overlapping said bracket such that in the locked position only the tip of the angled portion contacts said bracket, said bottom angled portion capable of being inserted into said slot in said anchor rail and rotated underneath said anchor rail such that in the locked position only the tip contacts the anchor rail; a plurality of resilient mounts positioned between the bottom of said box and each of said anchor rails, whereby said resilient mounts assist in maintaining anchoring pressure between said box and said anchor rails and cushion said box against shocks when said box and chassis are transported.

2. The system of claim 1, including a pair of spaced parallel side rails perpendicularly joining said anchor rails whereby said means for securing said anchor rails to said chassis also secure said side rails to said chassis.

3. The system of claim 2 whereby said securing means are totally embedded within said side rails, anchor rails and chassis.

* * * * *